(12) United States Patent
Lee et al.

(10) Patent No.: US 7,304,118 B2
(45) Date of Patent: Dec. 4, 2007

(54) POLYETHYLENE PIPE HAVING BETTER MELT PROCESSIBILITY AND HIGH RESISTANCE TO STRESS AND METHOD OF PREPARING THE SAME USING METALLOCENE CATALYST

(75) Inventors: Ki Soo Lee, Daejeon (KR); Choong Hoon Lee, Daejeon (KR); Sangwoo Lee, Daejeon (KR); Eunjung Lee, Daejeon (KR); Soojeong Lee, Daejeon (KR); Seungwoo Choi, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 11/100,659

(22) Filed: Apr. 7, 2005

(65) Prior Publication Data
US 2005/0228139 A1 Oct. 13, 2005

(30) Foreign Application Priority Data
Apr. 8, 2004 (KR) .................. 10-2004-0024106

(51) Int. Cl.
C08F 4/6592 (2006.01)
C08F 210/16 (2006.01)

(52) U.S. Cl. .............. 526/348.3; 526/113; 526/114; 526/118; 526/119; 526/348; 526/348.2; 526/348.4; 526/348.6; 526/160; 525/240

(58) Field of Classification Search .............. 526/348, 526/348.2, 348.3, 348.4, 348.6, 113, 114, 526/118, 119, 160; 525/240
See application file for complete search history.

(56) References Cited

U.S. PATENT DOCUMENTS 6,340,730 B1 * 1/2002 Murray et al. .............. 526/114

FOREIGN PATENT DOCUMENTS

| JP | 57-170913 | 10/1982 |
|---|---|---|
| JP | 58-19309 | 2/1983 |
| JP | 60-1252 | 1/1985 |
| JP | 60-35006 | 2/1985 |
| JP | 60-35007 | 2/1985 |
| JP | 61-130314 | 6/1986 |
| JP | 61-221208 | 10/1986 |
| JP | 62-121709 | 6/1987 |
| JP | 62-121711 | 6/1987 |
| JP | 63-58090 | 3/1988 |
| JP | 2-253076 | 10/1990 |
| JP | 6-248089 | 9/1994 |
| JP | 7-41610 | 2/1995 |
| JP | 7-157568 | 6/1995 |
| JP | 7-258496 | 10/1995 |
| JP | 7-330992 | 12/1995 |
| JP | 8-73670 | 3/1996 |
| JP | 9-20867 | 1/1997 |
| JP | 9-133270 | 5/1997 |
| JP | 9-324081 | 12/1997 |
| JP | 10-182757 | 7/1998 |
| JP | 10-193468 | 7/1998 |
| JP | 2000-343583 | 12/2000 |
| JP | 2004-217802 | 8/2004 |
| KR | 1019890000036 | 3/1989 |
| KR | 2001-0003325 | 1/2001 |
| WO | WO 98/49209 | 11/1998 |
| WO | WO 98/57998 | * 12/1998 |
| WO | WO 01/98409 | 12/2001 |

OTHER PUBLICATIONS

PCT International Search Report; International Application No. PCT/KR2005/000854; International Filing Date: Mar. 24, 2005; Date of Mailing Jul. 12, 2005.
"Mild Protection and Deprotection of Alcohols as Ter-Butyl Ethers in the Field of Pheromone Synthesis"; Authors: A. Alexakis, M. Gardette and S. Colin; Tetrahedron Letters, vol. 29, No. 24, 1988; pp. 2951-2954.
"The Molecular Structure of Polyethylene. V. The Effect of Chain Branching and Molecular Weight on Physical Properties"; Authors: C.A. Sperati, W. A. Franta and H. W. Starkweather, Jr.; pp. 6127-6133, 1953.

* cited by examiner

Primary Examiner—Roberto Rabago
(74) Attorney, Agent, or Firm—Cantor Colburn LLP

(57) ABSTRACT

An ethylene-based copolymer for non-crosslinked water supply pipe is provided. The ethylene-based copolymer is prepared using a supported hybrid metallocene catalyst and has a dimodal or broad molecular weight distribution. The ethylene-based copolymer has a high density molecular structure in a low molecular weight and has a low density molecular structure with high content of a comonomer in a high molecular weight. The ethylene-based copolymer has a molecular weight distribution of 5-30 and the distribution of copolymerization of ethylene and $C_{3-20}$ α-olefin is localized in high molecular weight chains. Accordingly, the ethylene-based copolymer has superior processability, internal pressure creep resistance at high temperatures and environmental stress crack resistance.

8 Claims, No Drawings

POLYETHYLENE PIPE HAVING BETTER MELT PROCESSIBILITY AND HIGH RESISTANCE TO STRESS AND METHOD OF PREPARING THE SAME USING METALLOCENE CATALYST

BACKGROUND OF THE INVENTION

This application claims the benefit of Korean Patent Application No. 10-2004-0024106, filed on Apr. 8, 2004, in the Korean Intellectual Property Office, the disclosure of which is incorporated herein in its entirety by reference.

1. Field of the Invention

The present invention relates to a polyethylene copolymer to be used for water supply pipes, prepared using a supported hybrid metallocene catalyst that can synthesize polyolefin whose physical properties and molecular weight distribution can be more easily controlled compared to a conventional Ziegler-Natta catalyst.

2. Description of the Related Art

A plastic water supply pipe is composed of polyethylene, polyvinyl chloride, polypropylene, polybutene, and the like. Such a plastic pipe has a lower rigidity than a steel pipe, a cast iron pipe or copper pipe, but a demand therefor is increasing due to its high toughness, ease of installation, and superior chemical resistance such as chlorine. In particular, a polyethylene pipe has a higher toughness than a polyvinyl chloride or polypropylene pipe and can be heat bonded, and thus can be easily installed. The polyethylene pipe has also a high resistance to chlorine, which is contained in drinking water, when being used as a water supply pipe. Thus, a demand for the polyethylene pipe is increasing.

However, a conventional polyethylene pipe has been modified by a chemical-crosslinking or moisture-crosslinking due to inferior internal pressure resistance and environmental stress cracking resistance (ESCR) of a polyethylene resin. Such an improvement in the physical properties of the polyethylene resin by the chemical-crosslinking or moisture-crosslinking and an example of applying it to water supply pipes are known in the art.

A chemically-crosslinked pipe is fabricated by extruding a resin composition including polyethylene and an organic peroxide such as dicumyl peroxide in a pipe shape while heating the resin composition to a pyrolysis temperature of the organic peroxide or higher. The organic peroxide is pyrolyzed into organic radicals. The organic radicals generate polyethylene radicals so as to lead to crosslinking of the polyethylene.

A moisture-crosslinked pipe is fabricated by compounding polyethylene, a silane compound such as vinylethoxy silane, an organic peroxide, and silanol condensation catalyst, and then extruding the resulting composition in a pipe shape while heating the composition. A silane crosslinking is performed by exposing the molded pipe to moisture. This technology is disclosed in Japanese Patent Publication Nos. Sho 63-058090 and Japanese Patent Laid-Open Publication Nos. Hei 2-253076 and 7-258496.

Japanese Patent Laid-Open Publication No. Hei 8-073670 discloses a crosslinked polyethylene composition including a copolymer of ethylene and butene-1, having a specific melt index, Japanese Patent Laid-Open Publication No. Hei 9-324081 discloses a crosslinked polyethylene pipe fabricated using polyethylene and an specific antioxidant, and discloses a crosslinked pipe fabricated using polyolefin having a number of double bonds. Japanese Patent Publication No. Sho 57-170913 discloses a crosslinked pipe fabricated using polyethylene with a specific density and molecular weight, Japanese Patent Laid-Open Publication Nos. Hei 9-020867 and 7-157568 disclose a crosslinked pipe fabricated using a silane modified graft polyethylene with a narrow molecular weight distribution, and Japanese Patent Laid-Open Publication No. Hei 7-041610 discloses a crosslinked pipe for drinking water, fabricated using a specific organic peroxide. Japanese Patent Publication No. Sho 60-001252 discloses a crosslinked pipe fabricated using an activated carbon, silica, and alumina, Japanese Patent Laid-Open Publication No. Hei 10-182757 discloses a pipe for supplying water or hot water, fabricated using a specific organic unsaturated silane and a specific radical generator, Japanese Patent Laid-Open Publication No. Hei 7-330992 discloses a method of fabricating a pipe using an epoxy compound, and Japanese Patent Laid-Open Publication No. Hei 6-248089 discloses a crosslinked pipe fabricated using a high density polyethylene.

However, the polyethylene resin that is used as a raw material in the conventional technologies is prepared using a conventional polymerization catalyst such as a Ziegler-Natta catalyst or vanadium catalyst. The use of such an ethylene polymer causes various problems. That is, when the conventional ethylene polymer that has a broad molecular weight distribution and more comonomers incorporated in low molecular weight components than in high molecular weight components is used to fabricate a crosslinked pipe, the low molecular weight components are mainly crosslinked and the high molecular weight components are not sufficiently crosslinked. Thus, the crosslinked pipe has an inferior mechanical strength, in particular, internal pressure creep resistance at high temperatures.

When molding a moisture-crosslinked pipe, a large amount of an unsaturated silane compound should be added in order to sufficiently occur a silane crosslinking in the high molecular weight compounds. The silane crosslinked pipe has an offensive odor due to the unsaturated silane compound. In the process of pipe extrusion, a long term processing is difficult due to die gum from polyethylene residue.

A metallocene catalyst system comprises a main catalyst whose main component is a transition metal compound, mainly a Group IV metal and an organometallic compound cocatalyst whose main component is aluminum. Such a catalyst offers a polymer having a narrow molecular weight distribution depending on the single site characteristics. The molecular weight and molecular weight distribution of polyolefin are important factors in determining the fluity and mechanical properties that affect the physical properties and processability of a polymer. In order to manufacture various polyolefin products, it is important to improve melt processability through the control of the molecular weight distribution (C. A. Sperat, W. A. Franta, H. W. Starkweather Jr., *J. Am. Chem. Soc.*, 75, 1953, 6127). Especially for polyethylene, physical properties such as toughness, strength, ESCR, etc. are very important. Therefore, a method of preparing a polyolefin having a bimodal or broad molecular weight distribution in order to enhance mechanical properties in high molecular weight components and processability in low molecular weight components has been proposed.

Recently, attempts to prepare an ethylene polymer with a molecular weight distribution of 2-3 using a catalyst resulted from a metallocene compound and aluminoxane and the like are disclosed in Japanese Patent Publication Nos. Sho 58-019309, 60-035006, 60-035007, 61-130314, 61-221208, 62-121709, and 62-121711. Japanese Patent Laid-Open Publication No. Hei 10-193468 discloses a crosslinked pipe fabricated using a polyethylene obtained by a metallocene catalyst. However, since this ethylene polymer has, in particular, insufficient fluity due to a narrow molecular weight distribution, heat is generated in an extruder and a premature crosslinking partially occurs. Thus, the extruded pipe has a rough surface and a lower mechanical strength.

The chemically crosslinked pipes and moisture-crosslinked pipes are not suitable for drinking water due to the remaining unreacted monomers, flexibility in the installation is diminished, and heat bonding is difficult.

The inventors made efforts to design an polyethylene composition that can maintain rigidity by increasing a comonomer content in high molecular weight components and decreasing a comonomer content in low molecular weight components, in order to fabricate a pipe having a sufficient resistance to stress without crosslinking of polyethylene. As a result, the inventors prepared an ethylene-based copolymer having a bimodal or broad molecular weight distribution and superior processability, resistance to stress, and ESCR due to copolymerization of ethylene and $C_{3\text{-}20}$ $\alpha$-olefin mainly occurring in high molecular weight chains by using a supported hybrid catalyst in which a metallocene compound suitable to prepare a low molecular weight polyethylene and a metallocene compound suitable to prepare a high molecular weight polyethylene are supported on a support, thereby completing the present invention.

SUMMARY OF THE INVENTION

The present invention provides an ethylene-based copolymer for non-crosslinked water supply pipes, which does not give off an odor, does not increase a load of an extruder, does not generate heat and die gum from polyethylene residue, keeps the characteristics of a thermoplastic resin to be recycled, is inexpensive, and can be molded into a flexible pipe that is convenient to be installed.

According to an aspect of the present invention, there is provided an ethylene-based copolymer for crosslinked water supply pipes, obtained by copolymerizing ethylene and $C_{3\text{-}20}$ $\alpha$-olefin using a supported hybrid catalyst in which at least two different metallocene compounds are supported on a support, the ethylene-based copolymer having a density of 0.930-0.960 g/cm$^3$, a melt index of 0.3-1.0 g/10 min (190 degrees, 2.16 kg load), and a molecular weight distribution (weight average molecular weight/number average molecular weight) of 5-30.

DETAILED DESCRIPTION OF THE INVENTION

Hereinafter, the present invention will be described in more detail.

A polyethylene prepared using a metallocene catalyst has a relatively narrow molecular weight distribution due to a uniform molecular weight and a more uniform distribution of $\alpha$-olefin comonomers compared to a polyethylene prepared a Ziegler-Natta catalyst, and superior physical properties due to reduction of side reaction by catalyst residues. However, the polyethylene prepared using the metallocene catalyst has inferior workability due to a narrow molecular weight distribution, and in particular, has significantly lowered producibility upon pipe production due to the effects of extrusion load. It is difficult to apply the polyethylene prepared using the metallocene catalyst to products that should have superior internal pressure creep resistance and ESCR, such as a water supply pipe, due to a lack of high molecular weight ethylene content at the same level of the melt index.

However, in the present invention, a supported hybrid catalyst where metallocene compounds are supported on a support is used to prepare an ethylene-based copolymer having a bimodal or broad molecular weight distribution and a molecular weight distribution of 5-30, thus superior processability upon molding the products and superior internal pressure creep resistance and ESCR due to intensive copolymerization of $\alpha$-olefin comonomer in high molecular weight ethylene chains.

The ethylene-based copolymer has an ethylene content of 55-99 wt. %, and preferably 65-98 wt. %, and more preferably 70-96 wt. %, and a $C_{3\text{-}20}$ $\alpha$-olefin content of 1-45 wt. %, and preferably 2-35 wt. %, and more preferably 4-20 wt. %.

The supported hybrid catalyst where at least two different metallocene compounds are supported on a single support is used to prepare an ethylene-based copolymer having a bimodal or broad molecular weight distribution, wherein a metallocene compound in the supported hybrid catalyst (hereinafter, is abbreviated to "a first metallocene compound") is used to mainly produce a low molecular polyethylene and the other metallocene compound (hereinafter, is abbreviated to "a second metallocene compound") is used to mainly produce a high molecular polyethylene. A high performance ethylene-based copolymer in which $\alpha$-olefin comonomers intensively bond to high molecular weight ethylene chains can be prepared by functions of the two metallocene compounds.

Examples of a support useful for the supported hybrid catalyst include silica dried at high temperatures, silica-alumina, silica-magnesia, and the like. These supports may typically contain oxides such as $Na_2O$, carbonates such as $K_2CO_3$, sulfates such as $BaSO_4$, nitrates such as $Mg(NO_3)_2$. Although a smaller amount of alcohol groups (—OH) on the surface of the support is preferable, removal of all alcohol groups is practically impossible. The amount of the alcohol groups (—OH) is preferably 0.1-10 mmol/g, and more preferably 0.1-1 mmol/g, still more preferably 0.1-0.5 mmol/g. The amount of the surface alcohol groups (—OH) can be controlled by various preparation processes or drying conditions of a support (for example, temperature, time, and drying method such as vacuum or spray dry). To reduce side reactions by some alcohol groups (—OH) which remain after drying, a catalyst prepared by chemically removing alcohol groups (—OH) while maintaining highly reactive siloxane groups involved in supporting can also be used (Korean Patent Laid-Open Publication No. 2001-003325).

In the supported hybrid catalyst, the metallocene compounds are selected from the following compounds.

The first metallocene compound in the supported hybrid catalyst is a compound represented by Formula (1) below.

$(C_5R^1)_p(C_5R^1)MQ_{3-p}$      (1)

in which M is a Group IV transition metal;

$(C_5R^1)$ is a metalloid radical of a Group XIV metal substituted by a hydrogen radical, $C_{1\text{-}20}$ alkyl radical, alkenyl radical, aryl radical, alkylaryl radical, arylalkyl radical or hydrocarbyl; or a cyclopentadienyl or a substituted cyclopentadienyl ligand wherein two neighboring carbon atoms of $C_5$ are connected by a hydrocarbyl radical to form a $C_4$ to $C_8$ ring;

Q is a halogen, $C_{1\text{-}20}$ alkyl radical, alkenyl radical, aryl radical, alkylaryl radical, arylalkyl radical or hydrocarbyl;

p is 0 or 1; and at least one hydrogen radical in $R^1$ is substituted by a radical represented by the following Formula (a), a radical represented by the following Formula (b) or a radical represented by the following Formula (c):

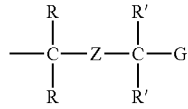
(a)

in which Z is oxygen or sulfur;

each of R and R' is an identical or different hydrogen radical, $C_{1-40}$ alkyl, cycloalkyl, aryl, alkenyl, alkylaryl, arylalkyl or arylalkenyl radical, and two R's may be connected to form a ring;

G is a $C_{1-40}$ alkoxy, aryloxy, alkylthio, arylthio, phenyl or substituted phenyl, and may be connected to R' to form a ring;

if Z is sulfur, G should be an alkoxy or aryloxy; and if G is an alkylthio, arylthio, phenyl or substituted phenyl, Z should be oxygen; and

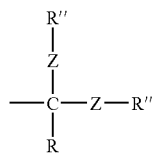
(b)

in which Z is oxygen or sulfur, and at least one of two Zs is oxygen;

each of the R and R'' is an identical or different hydrogen radical, $C_{1-40}$ alkyl, cycloalkyl, aryl, alkenyl, alkylaryl, arylalkyl or arylalkenyl radical;

R and R'' may be connected to form a ring; and unless both R''s are hydrogen radicals, they may be connected to form a ring; and

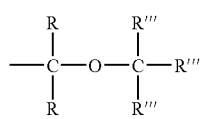
(c)

in which each of the R and R''' is an identical or different hydrogen radical, $C_{1-40}$ alkyl, cycloalkyl, aryl, alkenyl, alkylaryl, arylalkyl or arylalkenyl radical;

two neighboring R'''s may be connected to form a ring; and if at least one of the Rs is a hydrogen radical, all the R'''s are not hydrogen radicals, and if at least one of the R'''s is a hydrogen radical, all the Rs are not hydrogen radicals.

The second metallocene compound in the supported hybrid catalyst is a compound represented by the following Formula (2) or (3).

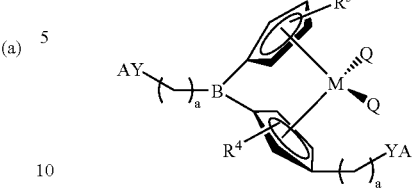
(2)

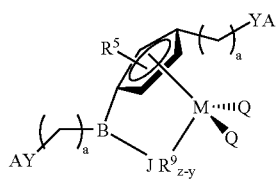
(3)

in which M is a Group IV transition metal;

each of $(C_5R^3)$, $(C_5R^4)$ and $(C_5R^5)$ is a cyclopentadienyl or a substituted cyclopentadienyl ligand which is a metalloid of a Group XIV metal substituted by an identical or different $C_{1-40}$ alkyl, cycloalkyl, aryl, alkenyl, alkylaryl, arylalkyl, arylalkenyl radical or hydrocarbyl, or a substituted cyclopentadienyl ligand wherein two neighboring carbon atoms of $C_5$ are connected by a hydrocarbyl radical to form one or more $C_4$ to $C_{16}$ ring;

each Q is an identical or different halogen radical, $C_{1-20}$ alkyl radical, alkenyl radical, aryl radical, alkylaryl radical, arylalkyl radical or $C_{1-20}$ alkylidene radical;

B is a bridge that binds two cyclopentadienyl ligands or binds a cyclopentadienyl ligand and $JR^9_{z-y}$ by a covalent bond, the cyclopentadienyl comprising a $C_{1-4}$ alkylene radical, dialkylsilicon or germanium, or alkyl phosphine or amine;

$R^9$ is a hydrogen radical, $C_{1-20}$ alkyl radical, alkenyl radical, aryl radical, alkylaryl radical or arylalkyl radical;

J is a Group XV element or a Group XVI element;

Y is oxygen or nitrogen;

A is a hydrogen radical, $C_{1-20}$ alkyl radical, alkenyl radical, aryl radical, alkylaryl radical, arylalkyl radical, alkylsilyl radical, arylsilyl radical, methoxymethyl, t-butoxymethyl, tetrahydropyranyl, tetrahydrofuranyl, 1-ethoxyethyl, 1-methyl-1-methoxyethyl or t-butyl;

z-y is 1 or 2;

a is an integer of 4 to 8; and at least one hydrogen radical of the $R^3$, $R^4$ and $R^5$ of $(C_5R^3)$, $(C_5R^4)$ and $(C_5R^5)$ is substituted by a radical selected from the radical represented by Formula (a), the radical represented by Formula (b) and the radical represented by formula (c) as defined in Formula (1) above.

Examples of a cocatalyst useful to activate the metallocene compounds, alkyl aluminium compounds, such as trimethyl aluminium, triethyl aluminium, triisobutyl aluminium, trioctyl aluminium, methyl aluminoxane, ethyl aluminoxane, isobutyl aluminoxane, and butyl aluminoxane, neutral or ionic boron based compounds such as tripentafluoro phenylboron and tributylammonium tetrapentafluoro phenylboron.

A low molecular weight polyolefin prepared using the supported hybrid catalyst has preferably a molecular weight ranging from 1000 to 100,000 and a high molecular weight polyolefin prepared using the supported hybrid catalyst has preferably a molecular weight higher than that of the low molecular weight, ranging from 10,000 to 1,000,000.

The present invention also provides a method of preparing an ethylene-based copolymer, the method including copolymerizing ethylene and $C_{3-20}$ α-olefin in the presence of a supported hybrid catalyst in which at least two different metallocene compounds are supported on a support.

That is, a supported hybrid catalyst is prepared by sequentially adding at least two different metallocene compounds having different polymerization characteristics for olefin to a single support, and then an ethylene-based copolymer having various properties and a bimodal or broad molecular weight distribution is prepared by inherent specific olefin polymerization characteristics of the respective metallocene compounds using the supported hybrid catalyst.

Specifically, an ethylene-based copolymer is prepared using a supported hybrid catalyst which can easily control a molecular weight distribution even in a single reactor by impregnating a first metallocene compound inducing a low molecular weight olefin, a second metallocene compound inducing a high molecular weight olefin, and a cocatalyst with a single support.

A content of the Group IV metal of the finally obtained supported hybrid catalyst for olefin polymerization is 0.1-20 wt. %, and preferably 0.1-10 wt. %, and more preferably 1-3 wt. %.

A molar ratio of a Group XIII metal/a Group IV metal of the supported hybrid metallocene catalyst is 1-10,000, and preferably 1-1,000, and more preferably 10-100.

The molar ratio of the second metallocene compound to the first metallocene compound is recommended to be in the range of 0.01-100 to better control a molecular weight distribution of the target polyolefin (Mw/Mn=3~20).

The supported hybrid catalyst of the present invention can be used for olefin polymerization without treatment. Also, it can be prepared into a pre-polymerized catalyst by contacting the supported hybrid catalyst with an olefinic monomer such as ethylene, propylene, 1-butene, 1-hexene and 1-octene.

A polymerization process using the supported hybrid catalyst may be a solution process, a slurry process, a gas phase process, and a combination of slurry and gas phase processes, and preferably, a slurry or gas phase process, and more preferably, a slurry or gas phase process using a single reactor.

The supported hybrid catalyst can be used in an olefin polymerization process after being diluted into a slurry using an appropriate $C_{5-12}$ aliphatic hydrocarbon solvent, such as pentane, hexane, heptane, nonane, decane, or an isomer thereof; an aromatic hydrocarbon solvent, such as toluene or benzene; or a chlorine-substituted hydrocarbon solvent, such as dichloromethane or chlorobenzene. The solvent is preferably treated with a trace of aluminium to remove catalytic poisons such as water, air, and the like.

Examples of the olefinic monomer which can be polymerized using the supported hybrid catalyst include ethylene, propylene, α-olefin, cyclic olefin, and the like. A dienic olefinic monomer or trienic olefinic monomer having two or more double bonds can also be polymerized. Examples of such monomers include ethylene, propylene, 1-butene, 1-pentene, 4-methyl-1-pentene, 1-hexene, 1-heptene, 1-decene, 1-undecene, 1-dodecene, 1-tetradecene, 1-hexadecene, 1-icocene, norbornene, norbornadiene, ethylidenenorbornene, vinylnorbornene, dicyclopentadiene, 1,4-butadiene, 1,5-pentadiene, 1,6-hexadiene, styrene, α-methylstyrene, p-methylstyrene, divinylbenzene, 3-chloromethylstyrene, and the like. These monomers can also be copolymerized in combination.

The temperature for polymerizing these monomers in the presence of the supported hybrid catalyst of the present invention is 25-500° C., and preferably 25-200° C., and more preferably 50-100° C. The polymerization pressure is 1-100 Kgf/cm$^2$, and preferably 1-50 Kgf/cm$^2$, and more preferably 5-40 Kgf/cm$^2$.

A density of the ethylene-based copolymer is influenced by an amount of the α-olefin comonomer used. That is, as the amount of the α-olefin comonomer used increases, the density of the ethylene-based copolymer decreases. As the amount of the α-olefin comonomer used decreases, the density of the ethylene-based copolymer increases. The density of the ethylene-based copolymer is preferably 0.930-0.960 g/cm$^3$, in particular 0.933-0.952 g/cm$^3$ in order to obtain optimum internal pressure creep resistance and environmental stress cracking resistance (ESCR) of products.

A melt index of the ethylene-based copolymer is preferably 0.3-1.0 g/10 min, in particular 0.4-0.8 g/10 min in order to prevent a failure in the product molding due to drop and poor fluity in the molding process.

The present invention provides a method of preparing an ethylene-based copolymer, the method including copolymerizing ethylene and α-olefin using a supported hybrid catalyst in which at least two different metallocene compounds are supported on a support in a continuous slurry polymerization reactor at 75-85° C. by continuously supplying ethylene, a solvent and $C_{3-20}$ α-olefin at a constant ratio into the reactor.

In the preparation of the ethylene-based copolymer, an antioxidant, a pigment for adjusting the color, etc. can be used according to its final use. A phenol-based antioxidant is typically used in order to prevent a thermal oxidation and improve a long-term resistance to thermal oxidation when passing through an extruder and a typical color master batch is used as the pigment for adjusting color.

Since the ethylene-based copolymer obtained in the present invention has superior processability, internal pressure creep resistance and ESCR, it can be used to fabricate water supply pipes without crosslinking when molding pipes. Thus, since the ethylene-based copolymer itself is used as a raw material, a compounding process of a crosslinker is not required. The ethylene-based copolymer is easily processed in a typical extruder without modification of an appliance and power consumption is maintained at a constant, and thus processing costs are reduced.

The generation of the odor is prevented since an unreacted crosslinker does not remain. Thus, the pipe fabricated using the ethylene-based copolymer of the present invention is more suitable as a water supply pipe for drinking water than conventional pipes fabricated in a chemical-crosslinking or moisture-crosslinking method.

The present invention will now be described in greater detail with reference to the following examples. The following examples are for illustrative purposes only and are not intended to limit the scope of the invention.

Organic reagents and solvents required for the preparation of a catalyst and polymerization were obtained from Aldrich and purified by the standard methods. Ethylene was obtained from Applied Gas Technology as a high purity product and filtered to remove moisture and oxygen before polymerization. Catalyst synthesis, supporting and polymerization were carried out isolated from air and moisture to ensure reproducibility.

A 300 MHz NMR (Bruker) spectrum was obtained to identify the catalyst structure. An apparent density was determined with Apparent Density Tester 1132 (available from APT Institute fr Prftechnik) according to DIN 53466 and ISO R 60.

PREPARATION EXAMPLE 1

Preparation of a First Metallocene Catalyst—Synthesis of [$^t$Bu-O—(CH$_2$)$_6$—C$_5$H$_4$]$_2$ZrCl$_2$ t-Butyl-O—(CH$_2$)$_6$—Cl was prepared using 6-chlorohexanol according to a method reported in literature (Tetrahedron Lett. 2951 (1988)) and was reacted with NaCp to obtain t-Butyl-O—(CH$_2$)$_6$—C$_5$H$_5$ (yield: 60%, b.p. 80° C./0.1 mmHg). 1 equivalent of n-BuLi was dropwise added to the obtained t-Butyl-O—(CH$_2$)$_6$—C$_5$H$_5$ ligand, and then the mixture was reacted with 0.5 equivalent of ZrCl$_4$(THF)$_2$ at −20° C. or lower to obtain a white solid [$^t$Bu-O—(CH$_2$)$_6$—C$_5$H$_4$]$_2$ZrCl$_2$ (yield: 92%).

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H); $^{13}$C NMR (CDCl$_3$): 135.09, 116.66, 112.28, 72.42, 61.52, 30.66, 30.61, 30.14, 29.18, 27.58, 26.00.

PREPARATION EXAMPLE 2

Preparation of a Second Metallocene Catalyst—Synthesis of [$^t$Bu-O—(CH$_2$)$_6$(CH$_3$)Si(C$_5$H$_4$)(9-C$_{13}$H$_9$)]ZrCl$_2$ A $^t$Bu-O—(CH$_2$)$_6$Cl compound and Mg(O) were reacted in a diethyl ether (Et$_2$O) solvent to obtain 0.14 mol of a $^t$Bu-O—(CH$_2$)$_6$ MgCl solution, which is a Grignard reagent. Then, a MeSiCl$_3$ compound (24.7 mL, 0.21 mol) was added at −100° C. Stirring was carried out for over 3 hours at room temperature. Then, the solution was filtered and dried at vacuum to obtain a $^t$Bu-O—(CH$_2$)$_6$SiMeCl$_2$ compound (yield: 84%).

A fluorenyllithium (4.82 g, 0.028 mol)/hexane (150 mL) solution was slowly added for 2 hours to a $^t$Bu-O—(CH$_2$)$_6$SiMeCl$_2$ (7.7 g, 0.028 mol) solution dissolved in hexane (50 mL) at −78° C. A white precipitate (LiCl) was filtered out, and extraction was carried out using hexane. All volatile materials were removed by vacuum drying to obtain a pale yellow oily ($^t$Bu-O—(CH$_2$)$_6$)SiMe(9-C$_{13}$H$_{10}$) compound (yield: 99%).

A THF solvent (50 mL) was added, and a reaction with a C$_5$H$_5$Li (2.0 g, 0.028 mol)/THF (50 mL) solution was carried out at room temperature for over 3 hours. All volatile materials were removed by vacuum drying and extraction was carried out using hexane to obtain an orange oily ($^t$Bu-O—(CH$_2$)$_6$)(CH$_3$)Si(C$_5$H$_5$)(9-C$_{13}$H$_{10}$) compound, which is the target ligand (yield: 95%). The structure of the ligand was identified by $^1$H NMR.

$^1$H NMR(400 MHz, CDCl$_3$): 1.17, 1.15 (t-BuO, 9H, s), −0.15, −0.36 (MeSi, 3H, s), 0.35, 0.27 (CH$_2$, 2H, m), 0.60, 0.70 (CH$_2$, 2H, m), 1.40, 1.26 (CH$_2$, 4H, m), 1.16, 1.12 (CH$_2$, 2H, m), 3.26 (tBuOCH$_2$, 2H, t, 3JH-H=7 Hz), 2.68 (methyleneCpH, 2H, brs), 6.60, 6.52, 6.10 (CPH, 3H, brs), 4.10, 4.00 (FluH, 1H, s), 7.86 (FluH, 2H, m), 7.78 (FluH, 1H, m), 7.53 (FluH, 1H, m), 7.43-7.22 (FluH, 4H, m)

2 equivalents of n-BuLi were added to a ($^t$Bu-O—(CH$_2$)$_6$)(CH$_3$)Si(C$_5$H$_5$)(9-C$_{13}$H$_{10}$) (12 g, 0.028 mol)/THF (100 mol) solution at −78° C. Heating to room temperature, a reaction was carried out for over 4 hours to obtain an orange solid ($^t$Bu-O—(CH$_2$)$_6$)(CH$_3$)Si(C$_5$H$_5$Li)(9-C$_{13}$H$_{10}$Li) compound (yield: 81%).

A dilithium salt (2.0 g, 4.5 mmol)/ether (30 mL) solution was slowly added to a ZrCl$_4$ (1.05 g, 4.50 mmol)/ether (30 mL) suspension at −78° C. A reaction was carried out for 3 hours at room temperature. All volatile materials were removed by vacuum drying, and the resultant oily liquid was filtered by adding a dichloromethane solvent. The filtered solution was vacuum dried, and hexane was added to induce precipitation. The resultant precipitate was washed several times with hexane to obtain a red solid racemic-($^t$Bu-O—(CH$_2$)$_6$)(CH$_3$)Si(C$_5$H$_4$)(9-C$_{13}$H$_9$)ZrCl$_2$ compound (yield: 54%).

$^1$H NMR (400 MHz, CDCl$_3$): 1.19 (t-BuO, 9H, s), 1.13 (MeSi, 3H, s), 1.79 (CH$_2$, 4H, m), 1.60 (CH$_2$, 4H, m), 1.48 (CH$_2$, 2H, m), 3.35 (tBuOCH$_2$, 2H, t, 3JH-H=7 Hz), 6.61 (CpH, 2H, t, 3JH-H=3 Hz), 5.76 (CpH, 2H, d, 3JH-H=3 Hz), 8.13 (FluH, 1H, m), 7.83 (FluH, 1H, m), 7.78 (FluH, 1H, m), 7.65 (FluH, 1H, m), 7.54 (FluH, 1H, m), 7.30 (FluH, 2H, m), 7.06 (FluH, 1H, m)

$^{13}$C NMR (400 MHz, CDCl$_3$): 27.5 (Me3CO, q, 1JC-H=124 Hz), −3.3 (MeSi, q, 1JC-H=121 Hz), 64.6, 66.7, 72.4, 103.3, 127.6, 128.4, 129.0 (7C, s), 61.4 (Me$_3$COCH$_2$, t, 1JC-H=135 Hz), 14.5 (ipsoSiCH$_2$, t, 1JC-H=122 Hz), 33.1, 30.4, 25.9, 22.7 (4C, t, 1JC-H=119 Hz), 110.7, 111.4, 125.0, 125.1, 128.8, 128.1, 126.5, 125.9, 125.3, 125.1, 125.0, 123.8 (FluC and CpC, 12C, d, 1JC-H=171 Hz, 3JC-H=10 Hz)

PREPARATION EXAMPLE 3

Praparation of a Supported Hybrid Catalyst

Silica (XPO 2412, Grace Davison) was dehydrated for 15 hours at 800° C. in vacuum. 1.0 g of the silica was placed in 3 glass reactors. After adding 10 mL of hexane, 10 mL of a hexane solution dissolving the first metallocene compound prepared in Preparation Example 1 was added. Then a reaction was carried out for 4 hours at 90° C. while stirring the reactor. After the reaction was completed, the hexane was removed by layer separation. After washing three times with 20 mL of a hexane solution, the hexane was removed by suction to obtain a solid powder. A methylaluminoxane (MAO) solution containing 12 mmol of aluminium in a toluene solution was added at 40° C. while stirring. The unreacted aluminium compound was removed by washing a sufficient amount of toluene. Then, the remaining toluene was removed by suction at 50° C.

To prepare a hybrid catalyst, a toluene solution, dissolving the second metallocene compound prepared in Preparation Example 2, was added in a glass reactor. A reaction was carried out at 40° C. while stirring the reactor. After washing with a sufficient amount of toluene, drying was carried out to obtain a powder. The resultant supported hybrid catalyst can be used as a catalyst without further treatment. Alternatively, 30 psig of ethylene may be added for 2 minutes and a prepolymerization can be carried out for 1 hour at room temperature. The powder was vacuum dried to obtain a solid catalyst.

EXAMPLES 1 AND 2

1 kg of the supported hybrid catalyst of Preparation Example 3 was synthesized. The synthesized catalyst was placed in a sealed container under nitrogen atmosphere, emulsified in 50 L of purified hexane, and put inside a 100 L stirring tank reactor. The stirring tank reactor was run at 200 rpm. The polymerization was carried out in a 200 L continuous stirring tank reactor for high pressure which is equipped with a mechanical stirrer, capable of controlling the temperature and stirring continuously at 250 rpm. The polymer slurry removed from the reactor was passed through a centrifuge and a drier to obtain a powder. Ethylene was fed at a rate of 10-15 kg/hr at 80° C. The catalyst injection amount was controlled such that the ethylene pressure remains at 8-9 kgf/cm². Each 10 mL of the catalyst was injected at time intervals. The polymerization time was controlled by the solvent amount such that the residence time in the reactor is 2-3 hours. 1-Butene was used at an α-olefin to identify the copolymerization characteristics. A small amount of hydrogen was added to control the molecular weight.

Two ethylene-based copolymers (Examples 1 and 2) were prepared with a different injection amount of the supported hybrid catalyst prepared in Preparation Example 3 considering the ethylene polymerization activity and the response to 1-butene as the comonomer and hydrogen for molecular weight control. The activity, apparent density, density, molecular weight, molecular weight distribution and basic physical properties of each ethylene-based copolymer are displayed in Table 1. The catalyst of the present invention caused no process interruption due to fouling. The apparent density of the polymer was good, in the range of 0.3-0.5 g/mL.

EXAMPLES 3 AND 4

The ethylene-based copolymers obtained in Examples 1 and 2 were extruded using a single-screw extruder (L/D=22, compression ratio=3.5) at 210-230° C. to obtain pipes with an outer diameter of 32 mm and a thickness of 2.9 mm. The results of evaluating the characteristics are displayed in Table 1.

COMPARATIVE EXAMPLE 1

An ethylene copolymer was prepared using an Mg supported Ti type Ziegler Natta catalyst and using 1-butene as a comonomer in a continuous process as in Examples 1 and 2. 0.7 wt. % of an organic oxide and 0.3 wt. % of antioxidant were added the ethylene copolymer. The mixture was then extruded to obtain a chemically crosslinked pipe with the same dimension as in the above Examples. The results of evaluating the characteristics are displayed in Table 1.

COMPARATIVE EXAMPLE 2

An ethylene copolymer was prepared in the same manner as in Comparative Example 1. 2.0 wt. % of a silane compound, 0.3 wt. % of an organic peroxide, and 0.2 wt. % of an antioxidant were added to the ethylene copolymer. The mixture was extruded to obtain a moisture-crosslinked pipe with the same dimensions as in the above Examples. The results of evaluating of the characteristics are displayed in Table 1.

COMPARATIVE EXAMPLE 3

An ethylene copolymer was prepared using 1-butene as a comonomer in the same manner as in Comparative Example 1, except that a continuous two step slurry polymerization process was used. An ethylene homopolymerization was carried out in a first step reactor. After removing hydrogen, the resultant was transferred to a second step reactor. A copolymerization of ethylene/1-butene was continuously carried out to obtain an ethylene-based copolymer with a bimodal molecular weight distribution. The obtained ethylene-based copolymer was extruded to obtain a pipe with the same dimension as in the above Examples. The results of evaluating the characteristics are displayed in Table 1.

COMPARATIVE EXAMPLE 4

An ethylene-based copolymer was prepared using a solution polymerization process, 1-octene as a comonomer, and a Ziegler-Natta catalyst. The obtained ethylene-based copolymer was extruded to obtain a pipe with the same dimension as in the above Examples. The results of evaluating the characteristics are displayed in Table 1.

COMPARATIVE EXAMPLE 5

An ethylene-based copolymer was prepared using a [$^t$Bu-O—(CH$_2$)$_6$—C$_5$H$_4$]$_2$ZrCl$_2$ catalyst according to a standard method. A continuous slurry polymerization process was used and 1-butene was used as a comonomer. The obtained ethylene-based copolymer had a bimodal molecular weight distribution. A pipe with the same dimension as in the above Examples was molded. The results of evaluating the characteristics are displayed in Table 1.

EXPERIMENTAL EXAMPLE

The evaluation properties and evaluation methods of the ethylene-based copolymers prepared in the above Examples of the present invention and the above Comparative Examples are as follows. The pipes with an outer diameter of 32 mm and a thickness of 2.9 mm were molded and its physical properties were evaluated.

1. Physical Properties of Raw Materials

1) Density

The density was determined according to ASTM D792. For a sample containing a crosslinker, the measurements were conducted prior to the addition of the crosslinker.

2) Melt Index (2.16 kg)

The melt index was at 190° C. For a sample containing a crosslinker, the measurements were conducted prior to the addition of the crosslinker.

3) Molecular Weight Distribution

A number average molecular weight, a weight average molecular weight, and a Z average molecular weight were determined from a gel permeation chromatography (GPC). It is represented by a ratio of the weight average molecular weight to the number average molecular weight. For a sample containing a crosslinker, the measurements were conducted prior to the addition of the crosslinker.

4) Tensile Strength, Extension

According to ASTM D638, it is measured using a 3 mm thick hot press sheet at a stretch rate of 50 mm/min. For a sample containing a crosslinker, the measurements were conducted after crosslinking.

5) ESCR

According to ASTM D1693, the ESCR is determined by recording the time until F50 (50% fracture) using a 10% Igepal CO-630 Solution at 50° C. For a sample containing a crosslinker, the measurements were conducted after crosslinking.

6) Izod Impact Strength

According to ASTM D256, it was measured at 20° C. For a sample containing a crosslinker, the measurements were conducted after crosslinking.

2. Processability of Pipes

The processability was classified as "good", "fair" or "poor" on the basis of a line speed (m/min) upon pipe molding.

3. Physical Properties of Pipes

1) Internal Pressure Creep Resistance at 95° C.

A test stress of 3.5 Mpa was applied to the molded pipes in hot water at 95° C. and the breakdown time was recorded.

2) Appearance of Pipes

The appearance of pipes was observed with the naked eye and classified as "good", "fair" or "poor".

3) Odor

The molded pipe was cut into 10 pieces so as to have a length of 20 cm, and immersed in 5 L of hot water at 50° C. for 24 hours. Then, an odor of the water was classified as "good", "fair" or "poor".

4) Ease of Installation of Pipes

The ease of installation of the pipes was classified as "good", "fair" or "poor" on the basis of the probability of thermal bonding and flexibility when installating the pipes.

5) Cost Effectiveness

The cost effectiveness was classified as "good" or "bad" on the basis of the costs of raw materials and process and manufacturing costs of the pipes.

2 due to cost effectiveness and no odor, and can be thermally bonded, thus easily being installed. The product of Comparative Example 3 has a bimodal molecular weight distribution similar to the products of Examples 1 and 2, but has a limitation in the amount of comonomer added due to the Ziegler-Natta catalyst, and thus has too high density to be applied to products which should have flexibility, such as a water supply pipe, and has low productivity due to low MI. The product of Comparative Example 4 using 1-octent as a comonomer has sufficient physical properties, but is unfavorable costly due to the high costs of the comonomer and the process costs of solution polymerization. The product of Comparative Example 5 uses a metallocene catalyst as in Examples, but has poor processability due to a typical narrow single molecular weight distribution and is difficult to be processed in general extruders.

The ethylene-based copolymer according to the present invention has no odor problem when being used for water supply pipes since it is not crosslinked, and has no increase

TABLE 1

| Classification | Example 1 | Example 2 | Comparative Example 1 | Comparative Example 2 | Comparative Example 3 | Comparative Example 4 | Comparative Example 5 |
|---|---|---|---|---|---|---|---|
| Catalyst* | M | M | Z-N | Z-N | Z-N | Z-N | M |
| Polymerization process | Slurry | Slurry | Slurry | Slurry | Slurry | Solution | Slurry |
| Comonomer | C4-1 | C4-1 | C4-1 | C4-1 | C4-1 | C8-1 | C4-1 |
| Molding of pipe | Non-crosslinking | Non-crosslinking | Chemical-crosslinking | Moisture-crosslinking | Non-crosslinking | Non-crosslinking | Non-crosslinkign |
| Physical properties of raw material | | | | | | | |
| Density (g/cm³) | 0.933 | 0.940 | 0.949 | 0.948 | 0.946 | 0.933 | 0.940 |
| M I (2.16 kg) | 0.5 | 0.6 | 0.01 | 5.5 | 0.08 | 0.7 | 0.9 |
| Molecular weight distribution (Mw/Mn) | Bimodal 17.3 | Bimodal 18.2 | Unimodal 4.6 | Unimodal 4.2 | Bimodal 30.8 | Unimodal 4.7 | Unimodal 2.9 |
| Tensile strength (kg/cm²) | 280 | 275 | 301 | 293 | 292 | 264 | 252 |
| Extension (%) | 890 | 850 | 20 | 45 | 920 | 870 | 840 |
| ESCR, F50 | >1,000 | >1,000 | >1,000 | >1,000 | >1,000 | >1,000 | 580 |
| Izod impact strength (20° C.) | NB 25 | NB 24 | NB 22 | NB 18 | NB 14 | NB 27 | NB 4 |
| Processability of pipe | | | | | | | |
| Processability (line speed: m/min) | Good 19 | Good 18 | Poor 1.7 | Good 14 | Fair 7 | Good 18 | Poor (impossible) |
| Physical properties of pipe | | | | | | | |
| Internal pressure creep resistance at 95° C. (maintenance time) | >1,200 | >1,200 | >1,200 | >1,200 | >1,200 | >1,200 | — |
| Appearance | Good | Good | Good | Good | Good | Good | — |
| Odor | Good | Fair | Fair | Poor | Good | Good | — |
| Ease of Installation | Good | Good | Poor | Poor | Fair | Good | — |
| Cost effectiveness | Good | Good | Bad | Bad | Good | Bad | — |

Note
*Catalyst: M = Metallocene catalyst, Z-N = Ziegler-Natta catalyst

As apparent from Table 1, when the ethylene-based copolymers obtained in Examples 1 and 2 are applied to water supply pipes, since crosslinking is not performed, the pipes are more suitable for drinking water than the crosslinked pipes obtained in Comparative Examples 1 and of load of an extruder, heat, and die gum from polyethylene residue. Also, the ethylene-based copolymer is inexpensive since a compounding process of a crosslinker is not required and the pipe molded therefrom has sufficient flexibility and can be easily installed by thermal bonding.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An ethylene-based copolymer for non-crosslinked water supply pipes, obtained by copolymerizing ethylene and $C_{3-20}$ α-olefin using a supported hybrid catalyst in which at least two different metallocene compounds are supported on a support, the ethylene-based copolymer having a density of 0.930-0.960 g/cm$^3$, a melt index of 0.3-1.0 g/10 min (190 degrees centigrade, 2.16 kg load), an extension of 850% to 890% and a molecular weight distribution (weight average molecular weight/number average molecular weight) of 5-30.

2. The ethylene-based copolymer for non-crosslinked water supply pipes of claim 1, wherein the metallocene compound comprises a first metallocene compound represented by the following formula:

[$^t$Bu-O—(CH$_2$)$_6$—C$_5$H$_4$]$_2$ZrCl$_2$.

3. The ethylene-based copolymer for non-crosslinked water supply pipes of claim 1, wherein the metallocenecompound comprises a second metallocene compound represented by the following formula:

[$^t$Bu-O—(CH$_2$)$_6$(CH$_3$)Si(C$_5$H$_4$)(9-C$_{13}$H$_9$)]ZrCl$_2$.

4. The ethylene-based copolymer for non-crosslinked water supply pipes of claim 1, wherein a low molecular weight polyolefin obtained using the supported hybrid catalyst has a molecular weight ranging from 1000 to 100,000 and of a high molecular weight polyolefin has a molecular weight higher than that of the low molecular weight polyolefin, ranging from 10,000 to 1,000,000.

5. The ethylene-based copolymer for non-crosslinked water supply pipes of claim 1, which is prepared in a slurry or gas phase single reactor.

6. The ethylene-based copolymer for non-crosslinked water supply pipes of claim 1, which is prepared in two or more slurry or gas phase multi-step reactors.

7. The ethylene-based copolymer for non-crosslinked water supply pipes of claim 1, wherein α-olefin is propylene, 1-butene, 1-pentene, 4-methyl-1-pentene, 1-hexene, 1-heptene, 1-decene, 1-undecene, 1-dodecene, 1-tetradecene, 1-hexadecene, 1-icocene, 1,4-butadiene, 1,5-pentadiene, 1,6-hexadiene, styrene, α-methyistyrene, p-methylstyrene, divinyl benzene, 3-chloromethylstyrene, or a mixture thereof.

8. A molding material for non-crosslinked water supply pipes, prepared using the ethylene-based copolymer of claim 1.

* * * * *